United States Patent [19]
Agar et al.

[11] Patent Number: 5,444,383
[45] Date of Patent: Aug. 22, 1995

[54] DEVICE, SYSTEM AND METHOD FOR MEASURING AN INTERFACE BETWEEN TWO FLUIDS

[75] Inventors: Joram Agar, Grand Cayman, Cayman Islands; Itzack Tavori; Jacob Inbar, both of Herzliya, Israel

[73] Assignee: Agar Technologies Process & Environmental Limited Control Limited, Houston, Tex.

[21] Appl. No.: 98,305

[22] PCT Filed: Feb. 10, 1992
[86] PCT No.: PCT/US92/01142
§ 371 Date: Nov. 24, 1993
§ 102(e) Date: Nov. 24, 1993
[87] PCT Pub. No.: WO92/14163
PCT Pub. Date.: Aug. 20, 1992

[30] Foreign Application Priority Data

Feb. 8, 1991 [IL] Israel .......... 97193

[51] Int. Cl.⁶ .......... G01R 27/26
[52] U.S. Cl. .......... 324/697; 73/53.01; 324/639
[58] Field of Search .......... 324/662, 663, 697, 637, 324/601, 652, 639, 684, 690; 73/304 C, 53.01; 342/124; 340/605

[56] References Cited

U.S. PATENT DOCUMENTS

| | | |
|---|---|---|
| 3,792,331 | 2/1974 | Wissmiller et al. |
| 4,205,315 | 5/1980 | Fleenor .......... 342/124 |
| 4,850,223 | 7/1989 | Carlin .......... 73/49.21 |
| 5,264,308 | 11/1993 | Clark .......... 340/605 |

FOREIGN PATENT DOCUMENTS

| | | |
|---|---|---|
| 0180357 | 5/1986 | European Pat. Off. |
| 2203066 | 5/1974 | France |
| 1448280 | 9/1976 | United Kingdom |
| 2179454 | 3/1987 | United Kingdom |
| 2233765 | 1/1991 | United Kingdom |

*Primary Examiner*—Maura K. Regan
*Attorney, Agent, or Firm*—Helfgott & Karas

[57] ABSTRACT

For measuring an interface between two fluids, a device (10, 75, 90) having an electrical circuit comprising transmitting means, a detector, a first antenna (14, 18, 78, 82, 92) and a second electrically grounded antenna (15, 18, 79, 83, 93), the transmitting means being arranged to transmit electrical impulses between the first and second antennas through one of the two fluids so as to be absorbed thereby, and the detector being arranged to detect a change in either an impedance or a rate of absorption of energy which occurs at the interface. The device includes a housing (11, 91) for placing in the fluids so as to contact the interface along a periphery of the housing towards a first end thereof, the first antenna (14, 18, 78, 82, 92) projects from the housing at said periphery, and the electrical circuit includes a coupling means (28) for coupling thereto a remote monitoring means whereby the interface may be measured remotely. Also disclosed are several preferred systems and methods employing such a device.

35 Claims, 7 Drawing Sheets

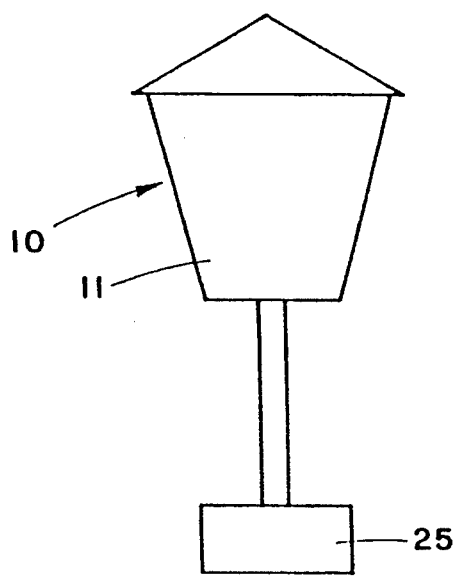
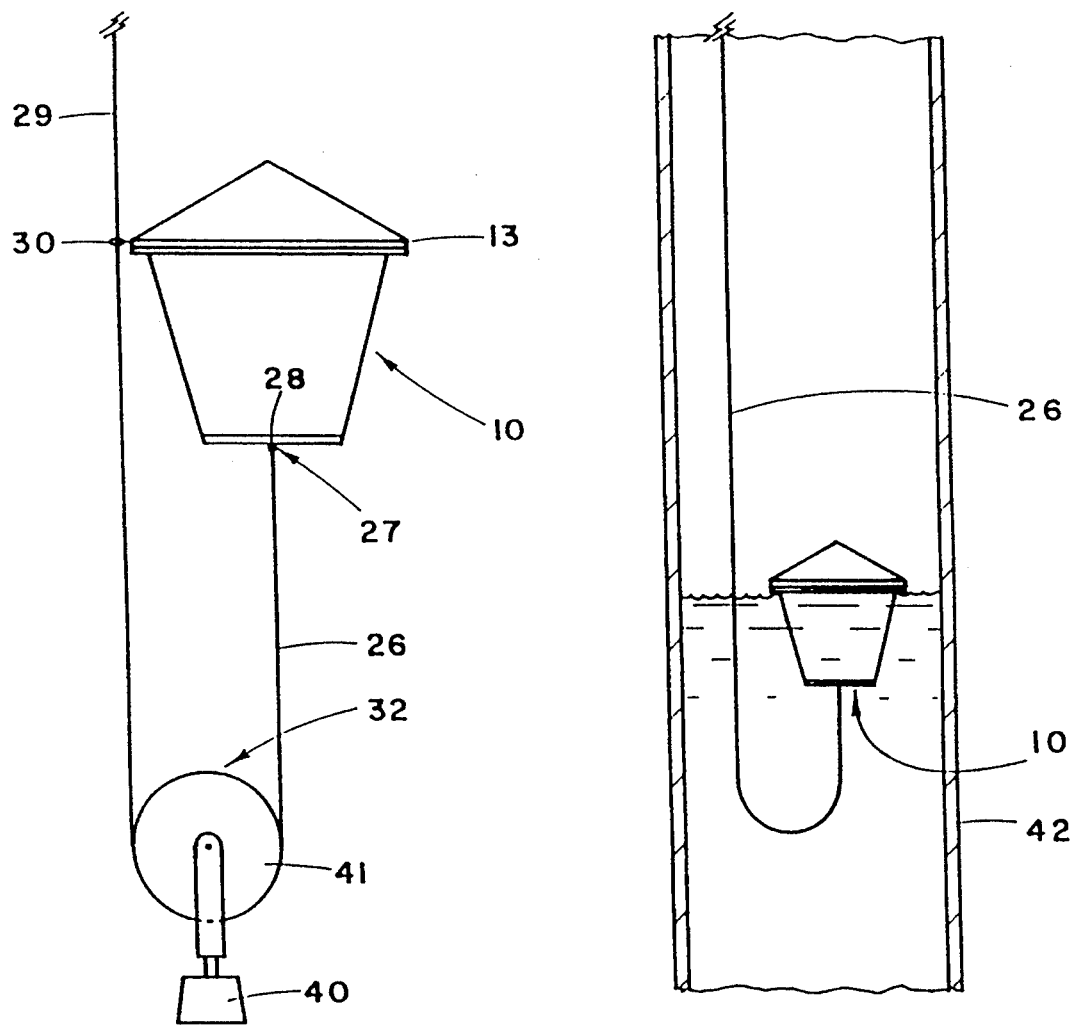
Fig. 4
Fig. 5    Fig. 6

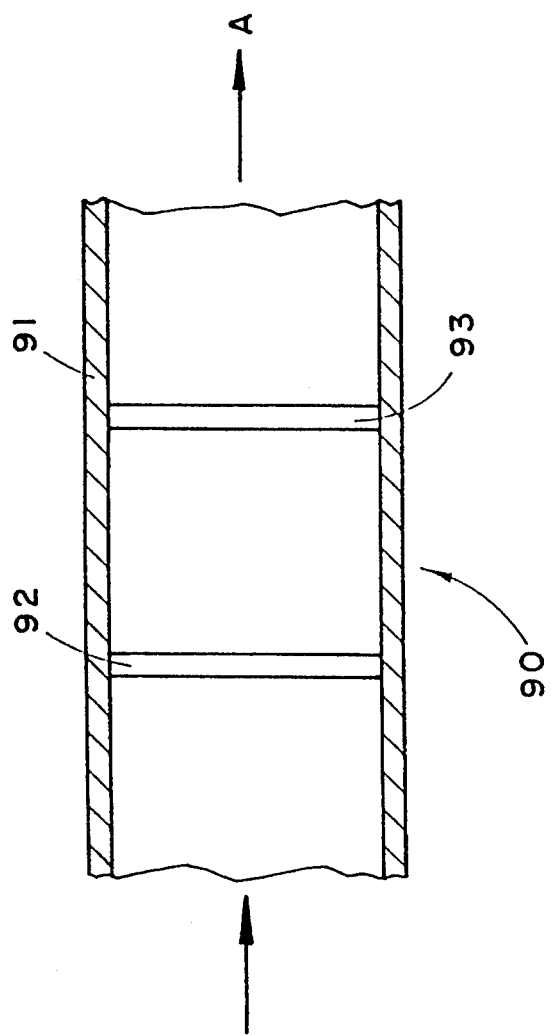

DEVICE, SYSTEM AND METHOD FOR MEASURING AN INTERFACE BETWEEN TWO FLUIDS

FIELD OF THE INVENTION

This invention relates to a device for measuring an interface between two fluids. In particular, it relates to the use of such a device in a system for detecting a thin layer of oil on water.

BACKGROUND OF THE INVENTION

It is the practice in the oil industry to store large quantities of oil in suitable containers. Over a period of time, the containers can corrode with the result that the oil stored therein seeps out and can reach the ground or surface water. This is a particular hazard when the oil containers are buried underground because the oil seepage can remain undetected for long periods of time unless steps are taken to detect the oil leakage at source. In order to monitor any oil leakage from storage tanks or pipelines, it is known to drill a number of monitoring wells in the ground around the storage container sufficiently deep to meet the ground water.

Devices for measuring an oil water interface so as to detect any oil floating on the water surface are known. Thus, U.S. Pat. No. 4,503,383 (Agar et al.) discloses a device for detecting an interface between two fluids of differing electrical properties, the device having an electrical circuit comprising transmitting means for transmitting electrical impulses to the fluids and a detector for detecting electrical impulses. An electrically conductive probe is immersed into the water so as to transmit the electrical impulses therethrough and to receive electrical impulses therefrom, whereby the received impulses vary as a function of the electrical impedance of the fluid. Specifically, air has a higher impedance than oil which in turn has a higher impedance than water. Consequently, at an interface between oil and water or between air and oil, the detector will detect a change in impedance corresponding to the presence of oil.

The variation in the received impulses may be due to a change in dielectric constant of the fluid seen by the detector, variation in heating effect caused by microwaves.

It has also been suggested to use devices of this kind for monitoring the water-air interface in a monitoring well so as to detect oil which seeps into the monitoring well. In such a device, the probe disclosed by Agar et al. is replaced by at least one ring antenna which floats on the surface of the water so as effectively to monitor the water-air interface. Immediately oil seeps on to the surface of the water, the impedance seen by the antenna varies, thereby providing immediate detection of the presence of oil on the water surface.

In practice, such a system is very difficult to implement. Monitoring wells have a typical diameter of 100 mm and typical depths of tens of meters. The devices discussed above include complicated and vulnerable electronics which are easily susceptible to damage when the device is lowered into the monitoring well.

Additionally, the accuracy of such a device depends on the ring antenna or antennas lying in contact with the water surface. If, as a result of the self-weight of the device, the device sinks slightly within the water, the antenna which originally contacted the surface of the water will now be immersed therein. Consequently, the device will be unable to detect any oil which subsequently seeps on to the water surface. In order to avoid this problem, it is known to maintain the antenna slightly above the water surface so that any slight tendency to sink does not cause the antenna to become immersed in the water. However, the gap between the antenna and the water must then be completely filled by any oil seeping on to the water surface before the oil can be detected. Thus, it is required to minimize the gap between the antenna and the water surface without allowing the antenna to be immersed in the water. This requirement is extremely difficult to fulfil in practice.

Oil storage containers have also been proposed which consist of a storage tank surrounded by an outer jacket. It is then possible to provide oil detection devices within the outer jacket so that any oil seepage from the storage tank itself will be detected by the detection devices. Such a proposal offers the advantages of lower costs and the ability to detect if water seeps in due to rupture of the outer jacket or if hydrocarbons leak from the storage tank. However, the oil industry is not a new industry and there are large numbers of underground oil storage containers currently in use which are not provided with such outer jackets and from which possible oil seepage must constantly be monitored. For such oil storage containers it is usual to employ monitoring wells. For monitoring oil seepage from such oil storage containers using a device of the kind described, it is important to be able to lower the device until it reaches the water surface, to monitor remotely the water-air interface and, periodically, to be able to withdraw the device without damaging it.

When used for monitoring the presence of oil on ground water in a monitoring well, the device is formed of a material and is so dimensioned that, in use, it floats with the antenna substantially touching the air-water interface. The seepage of oil on to the water surface is monitored remotely via an electrical cable coupled to the device and by means of which it can be lowered through the monitoring well until it reaches the water therein. Clearly, the weight of the cable adds to the self-weight of the device itself tending to push it further into the water. Since, in order to function, the first antenna must lie substantially on the water surface, the weight of the cable must be compensated for and this is difficult. This height, corresponding to the water table or ground water height is unpredictable and varies throughout the year.

Furthermore, foreign matter falling on to the device also tends to make it sink further into the water thereby reducing its effectiveness to monitor oil seepage on the water surface.

SUMMARY OF THE INVENTION

It is an object of the invention to provide a device which is especially adapted for measuring a water-oil-air interface in monitoring wells and addresses the above requirements.

According to a broad aspect of the invention there is provided a device for measuring an interface between two fluids, the device having an electrical circuit comprising transmitting means, a detector, a first antenna and a second electrically grounded antenna;

the transmitting means being arranged to transmit electrical impulses between the first and second antennas through one of the two fluids so as to be absorbed thereby, and the detector being arranged to detect a change in either an impedance or a rate of absorption of energy which occurs at the interface;

wherein:

the device includes a housing for placing in the fluids so as to contact the interface along a periphery of the housing towards a first end thereof, the first antenna projects from the housing at said periphery, and the electrical circuit includes a coupling means for coupling thereto a remote monitoring means whereby the interface may be measured remotely.

Such a device can, if required, be used even in those storage tanks employing an outer jacket since it can be disposed on a lower surface of the outer jacket with the first antenna uppermost. Any oil seepage from the oil storage container on to an internal surface of the outer jacket will cover the first antenna, thereby permitting immediate detection of the presence of oil, air or water.

According to one embodiment of the invention, the device is adapted to float in a liquid, typically water, such that the first antenna projects outwardly from the housing of the device so as make contact with the upper surface of the water. Any oil contamination now spilling on to the surface of the water contacts the first antenna, whereby the measured signal provides an indication of the presence of the contamination.

According to another embodiment of the invention, the device is provided with a hollow housing for permitting liquid flow therethrough. In this case, the first antenna projects inwardly from the internal periphery of the housing, although in all other respects it operates exactly the same as the floating device subject of the first embodiment.

BRIEF DESCRIPTION OF THE DRAWINGS

The invention will now be described, by way of non-limiting example only, with particular regard to a device for measuring an air-water-oil interface and with a system and method for use therewith, with regard to the accompanying drawings, in which:

FIG. 4 shows a device in accordance with a fourth embodiment of the invention;

FIG. 5 shows schematically a device according to the invention having a monitoring cable coupled thereto FIG. 6 relates to the device shown in FIG. 5 and shows schematically how such a device can be lowered into a monitoring well;

FIG. 16 shows schematically a modified device according to the invention for detecting and measuring liquids flowing therethrough.

DETAILED DESCRIPTION OF PREFERRED EMBODIMENTS

Figure 1:
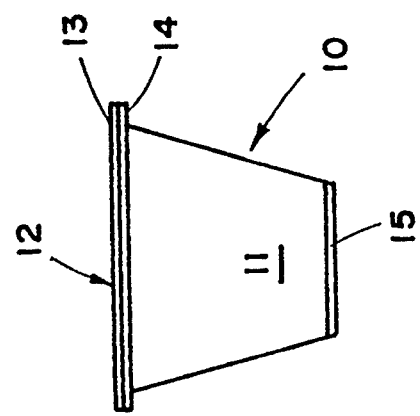
FIG. 1 shows schematically a device in accordance with a first embodiment of the invention.

Referring to FIG. 1 there is shown a device according to the invention depicted generally as 10 and comprising a conical housing 11 having at a first end thereof a cover 12 which overhangs the housing 11 so as to form an outwardly projecting flange portion 13. An antenna 14 (constituting a first antenna) formed of an electrically conductive ring bonded to an insulating substrate is fixed around the housing 11 underneath the flange portion 13. At a second end of the housing 11 opposite the flange portion 13 is fixed an antenna 15 (constituting a second antenna).

Within the housing 11 is an electrical circuit (not shown) comprising transmitting means and a detector both of which are connected to the first antenna 14. The second antenna 15 is connected to ground. The electrical circuit is itself not a feature of the invention and reference may be made to the above-mentioned U.S. Pat. No. 4,503,383 which describes a suitable circuit for discriminating between oil and water. More generally, however, any circuit capable of distinguishing between two different fluids by means of an antenna in contact with an interface between the two fluids.

The device 10 may be employed in one of two ways. For measuring spillage of a liquid on to a surface, the device is placed on to the surface so that the flange portion 13 is in contact with the surface and the first antenna 14 is uppermost in contact with air. Electrical impulses are transmitted between the first antenna 14 and the second antenna 15 permitting measurement of the impedance of the fluid in contact with the first antenna 14. By this means, the device 10 is sensitive to the air-oil-water interface and can detect which of these fluids is in contact with the first antenna 14.

Spillage of a liquid on to the surface covers the first antenna 14 thereby enabling the device 10 to detect the liquid at the liquid-air interface. Alternatively, the device 10 is so dimensioned that, in use, it floats in a volume of fluid with the flange portion 13 uppermost and the first antenna 14 substantially contacting an upper surface of the fluid. Seepage of oil on to the surface of the water contacts the first antenna 14 and is consequently detected by the device 10.

In both configurations, the liquid-air interface makes contact with the housing 11 along a periphery thereof and the first antenna 14 projects outwardly from the housing 11 substantially normally thereto at the periphery.

In the second configuration, a compromise has to be met between, on the one hand, any tendency which the device 10 has to sink slightly in the water such that the first antenna 14 lies completely submerged in water and, on the other hand, any compensation which is made to prevent the device 10 sinking resulting in an air gap between the antenna 14 and the top surface of the water. In the first case, when the antenna 14 lies completely submerged in water, the device 10 cannot operate because even if oil spills on to the water surface, the antenna 14 is not in contact with the water-oil interface. On the other hand, if the device 10 is pulled out of the water resulting in an air gap between the antenna 14 and the water surface, then the air gap must be completely filled by oil before the presence of oil can be registered by the device 10. Thus, very fine tuning is required in order to prevent the device 10 from becoming completely inoperative, on the one hand, but, on the other hand, not unduly reducing its sensitivity.

Many of the embodiments which will now be described relate to how the fine tuning can be achieved in practice. In the detailed description of the various embodiments, reference will be made to the appropriate Figures in which identical reference numerals are employed to identify equivalent components.

Figure 2:
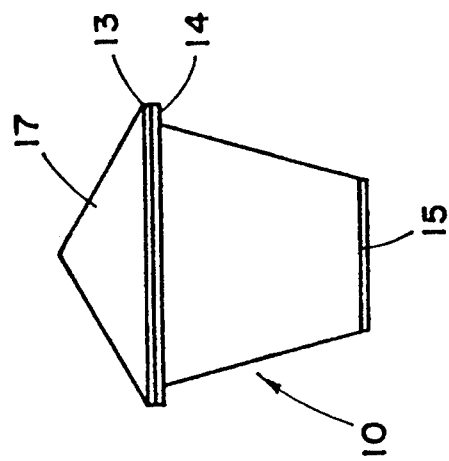
FIG. 2 shows schematically a device in accordance with a second embodiment of the invention.

Thus, referring to FIG. 2 of the drawings, there is shown a device 10 for use in a configuration wherein the flange portion 13 is uppermost with the first antenna 14 in contact with the water surface. The device 10 is typically used in this manner for detecting the presence of oil in monitoring wells which are used for monitoring oil seepage from underground oil storage containers. The monitoring wells are drilled from the surface of the earth until the ground water is reached, typically a distance of tens of meters. The diameter of such monitoring wells is typically 100 mm whilst the diameter of the flange portion 13 is of the order of 80 mm. Consequently, there is little clearance between the device 10 and the inside wall of the monitoring well and any foreign matter which falls into the monitoring well from the earth's surface would collect on the upper surface of the device 10 unless steps were taken to prevent this. Clearly, any foreign matter adhering to the device 10 would increase its weight, causing it to sink further into the water and possibly leading to the first antenna 14 becoming completely submerged thereby.

Therefore, a tapered cap portion 17 is provided having a base whose diameter is no less than that of the flange portion 13 and which is mounted symmetrically on the flange portion 13 whereby when the device 10 is in use, any deposits contacting the cap portion 17 are hindered from remaining thereon and from thereby altering the hydrostatic properties of the device 10.

Figure 3:
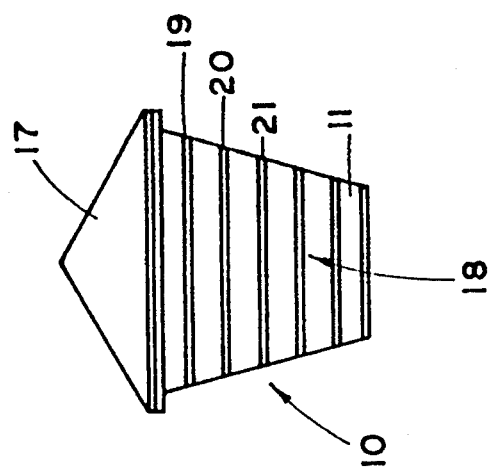
FIG. 3 shows a device in accordance with a third embodiment of the invention.

In FIG. 3 is shown a device 10 having a tapered cap 17 and having a plurality of bands 18 of an electrically conductive material each formed on a wall of the housing 11 and each being displaced from an adjacent band. Particular reference will now be made to an upper band 19, an intermediate band 20 and a lower band 21.

The electrical circuit within the device 10 is provided with a selection means coupled to all of the bands 18 for selecting one of them as the first antenna. In use, the device 10 is floated in a volume of water so that the intermediate band 20 is in contact with the water surface. If the selection means is coupled to the lower band 21 so that the band 21 functions as the first antenna, then because the band 21 is completely submerged within the water, only water will be detected by the device 10. On the other hand, if the upper band 19 is connected to the selection means, only air will be detected by the device 10. Clearly, the water surface lies somewhere between the upper band 19 and the lower band 21 and the selection means sequentially selects each band therebetween as the first antenna until the water-air interface is reached. The selection operation is performed continuously and ensures that the selected band functioning as the first antenna is always correctly located at the water surface.

In order for the device 10 to function properly, it is desirable that the first antenna 14 lies symmetrically disposed on the water surface so that as much of the water surface as possible is in contact with the first antenna 14. It is therefore desirable to prevent or at least reduce any tendency which the device tends to have to tilt.

FIG. 4 shows a device 10 having a stabilizing mass 25 supported from a lower end of the housing 11 thereby increasing the overall mass of the device 10. This, in turn, results in the device 10 being more inertial and having a lower tendency to tilt.

When the device 10 is used for detecting oil seepage in a monitoring well, the device 10 must be both operated and monitored remotely.

FIG. 5 shows schematically an electrical cable 26 connected at a first end 27 thereof to a coupling means 28 provided at the second end of the housing 11. A second end 29 of the electrical cable 26 is adapted for connecting to a remote monitoring means outside a monitoring well in which the device 10 is used. The second end 29 of the cable 26 is threaded through a ring 30 mounted on a periphery of the flange portion 13 so as to form a loop 32 in the electrical cable 26 at its lower end. When the electrical cable 26 is connected to the device 10 in such a manner, the device 10 may be lowered into a monitoring well or withdrawn therefrom from the second end 29 of the electrical cable 26.

A stabilizing mass 40 is suspended from a pulley 41 seated within the loop 32 of the cable 26. The stabilizing mass 40 renders the device 10 more inertial and therefore less liable to tilt in the water.

FIG. 6 shows pictorially a device 10 as shown in FIG. 5 but without the ring 30 in use within a monitoring well 42. It will be clear that part of the electrical cable 26 which lies below the surface of the first antenna 14 will be completely submerged in water thereby altering the hydrostatic properties of the device 10. Thus, the extent to which the first antenna 14 sinks under the water surface is dictated by Archimedes' Principle and is governed by the mass of the device 10 and the electrical cable 26 associated therewith. In particular, according to Archimedes' Principle, a floating body displaces its own weight of water whilst a body completely submerged under water displaces its own volume of water. Thus, the greater the volume of the electrical cable 26 beneath the water surface, the more water is displaced thereby causing the device 10 to rise against the self-weight of the electrical cable 26 connected thereto. Equilibrium is reached where the tendency of the device 10 to float in the water is exactly compensated for by the self-weight of the electrical cable 26 acting on the device 10.

Figure 7:
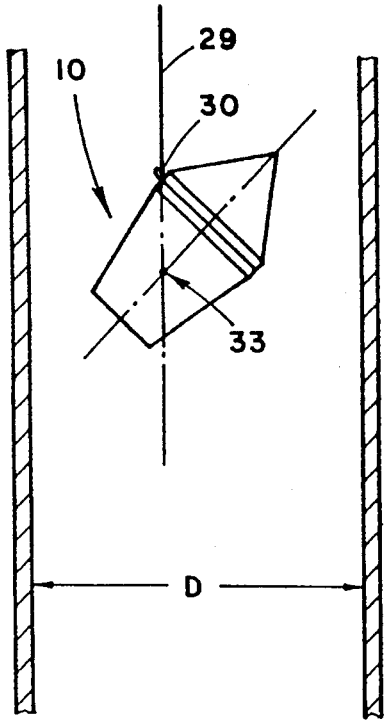
FIG. 7 relates to the device shown in FIG. 5 and shows schematically a method for lowering the device into a monitoring well.

FIG. 7 shows such a device 10 being lowered into, or withdrawn from, a monitoring well having an internal wall diameter of D. The device 10 tilts about the ring 30 until its center of gravity lies on a line acting through the second end 29 of the cable 26 from which the device 10 is supported.

Figure 8:
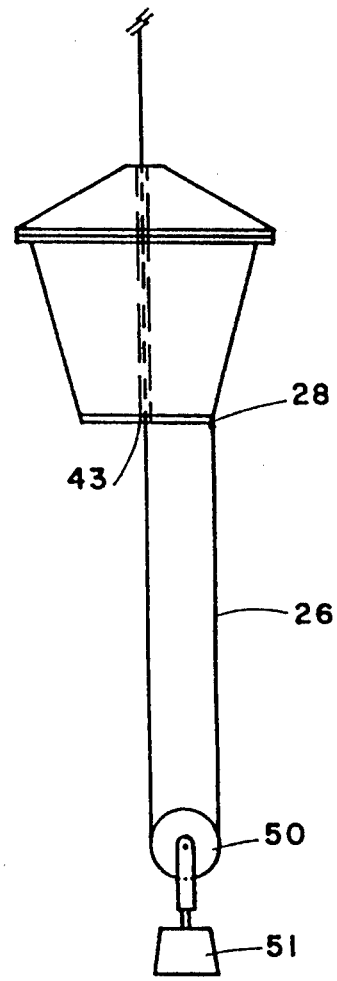
FIG. 8 shows schematically a method for lowering into a monitoring well a variation of the device shown in FIG. 5.

FIG. 8 shows a device 10 whose housing 11 is provided with an axial bore 43 extending therethrough. The electrical cable 26 is threaded through the axial bore 43 for connection at its first end 27 to the coupling means 28 within the housing 11. The device 10 is lowered into, and withdrawn from, a monitoring well by means of the electrical cable 26. Within the loop at the lower end of the cable 26, there is seated a pulley 50 from which a stabilizing mass 51 is suspended.

Figure 9:
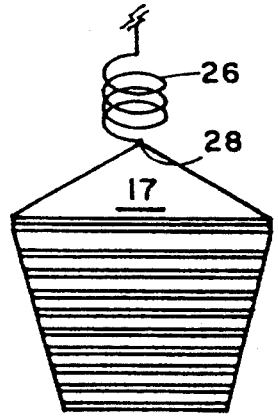
FIG. 9 relates to the device shown in FIG. 3 and shows schematically an alternative manner in which a connection cable may be attached thereto.

The invention envisages several different configurations for connecting the electrical cable 26 to the device 10 so that the overall symmetry of the device 10 is preserved and any tendency of the device 10 to tilt is reduced. Thus, referring to FIG. 9 of the drawings, there is shown an arrangement whereby the cable 26 is connected at its first end 27 to a coupling means 28 provided at the apex of the cap portion 17. When the device 10 is suspended from its uppermost central point from the cable 26, in such manner, the resulting arrangement is symmetrical about a longitudinal axis passing through the cable 26, barring any manufacturing intolerances causing asymmetry.

Figure 10:
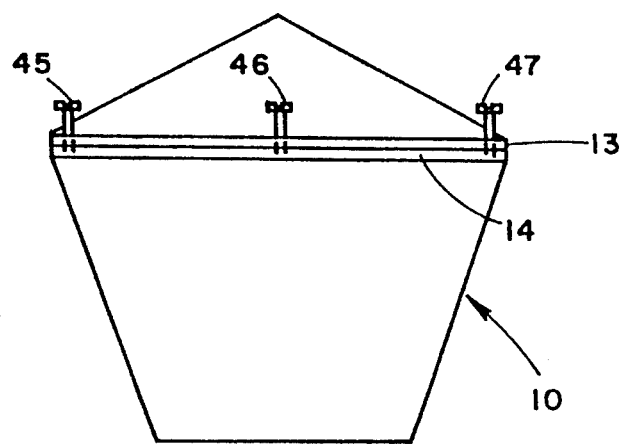
FIG. 10 shows schematically a device having a tiltable antenna attached thereto.

FIG. 10 of the drawings shows how the first antenna 14 is attached to the flange portion 13 by means of three screws 45, 46 and 47 disposed symmetrically around a periphery of the flange portion 13. The device 10 is calibrated using the three screws 45, 46 and 47 by floating it in water and then adjusting the three calibration screws, as required, until the lower surface of the first antenna 14 lies flush with the water surface.

Providing steps are then taken to connect the electrical cable 26 to the device 10 in such a manner that the pre-calibrated symmetry is preserved, it can be assured that, in use, the device 10 floats symmetrically with the antenna 14 making uniform contact with the water surface.

Figure 11:
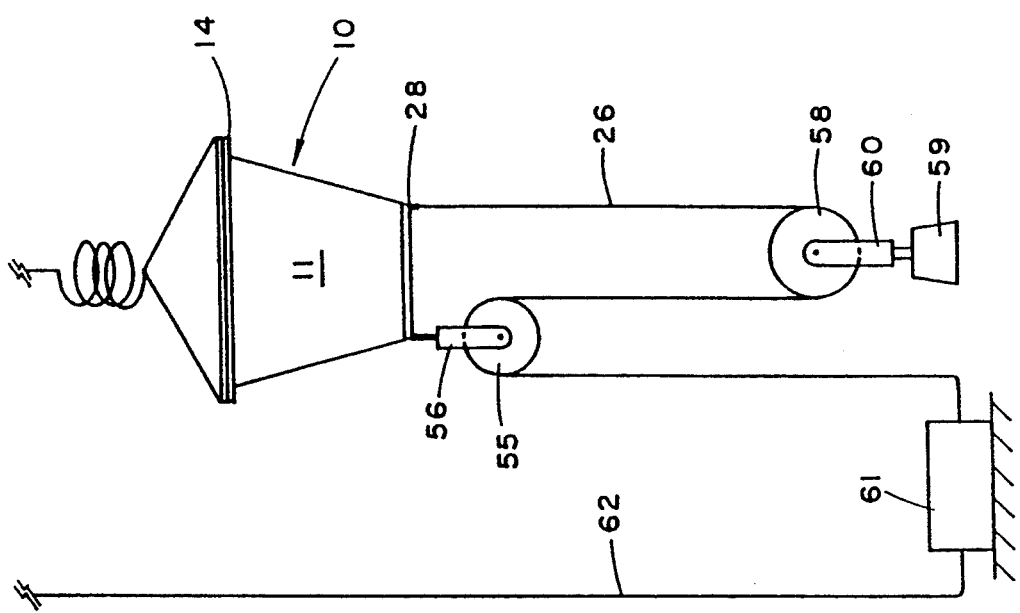
FIG. 11 relates to the device shown in FIG. 8 and shows schematically an alternative method for lowering the device into a monitoring well.

FIG. 11 shows an arrangement of a device 10 having a housing 11 and a first antenna 14 mounted at a first end of the housing 11. A coupling means 28 is provided at a first periphery of the second end of the housing 11 and a first pulley 55 is rotatably suspended from a second periphery of the second end of the housing 11, diametrically opposite the coupling means 28, by means of a bracket 56.

The electrical cable 26 is looped from the coupling means 28 over the first pulley 55 so as to form a loop 32 at a lower extremity thereof between the first pulley 55 and the coupling means 28. A second pulley 58 is seated within the loop 32 and a stabilizing mass 59 is suspended from the second pulley 58 by means of a bracket 60. The free end of the cable 26 over the pulley 55 is anchored to an anchoring means 61 to which a remote monitoring means (not shown) is electrically connected by means of an electrical cable 62. In such an arrangement, the device 10 receives electrical power via the electrical cable 26 which is in turn connected to the electrical cable 62 via the anchoring means 61. Such an arrangement ensures, not only that the device 10 is symmetrically weighted about its longitudinal axis, but also that all of the electrical cable 26 is submerged underneath the water surface. Thus, any tendency which the device 10 may have to float on, or sink within, the water merely alters the height of the stabilizing mass 59 with respect to the lower end of the housing 11. Thus, the height of the water surface and thus of the device 10, and thus of the water surface, does not alter the hydrostatic forces acting on the cable 26.

Figure 12:
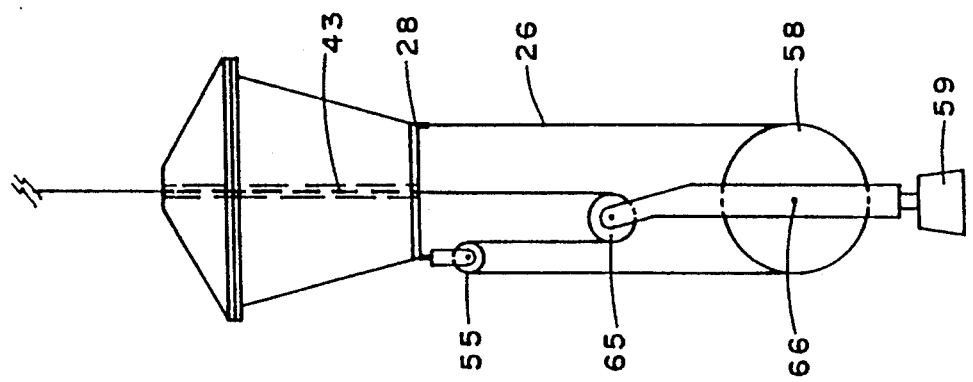
FIG. 12 is a pictorial representation relating to an alternative method for lowering the device into a monitoring well.

FIG. 12 shows an alternative arrangement similar to that shown in FIG. 11 but having a third pulley 65 rotatably fixed to the second pulley 58 by means of a bracket 66. As in the arrangement shown in FIG. 11, the electrical cable 26 is coupled at its first end to a coupling means 28 mounted at a first periphery of the lower end of the housing 11 and is looped over the first pulley 55 in an identical manner to that described above with reference to FIG. 11. The electrical cable 26 is threaded underneath the third pulley 65 and thence upwards through the axial bore 43 within the housing 11.

Figure 13:
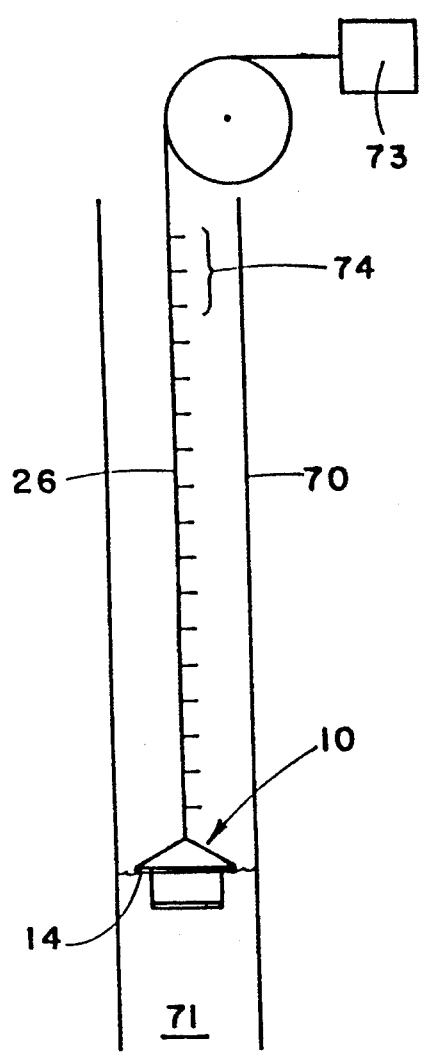
FIG. 13 shows schematically a servo-control device in a monitoring well.

FIG. 13 shows schematically a monitoring well 70 containing ground water 71 on an upper surface of which floats a device 10 according to the invention. A servo means 73 is fixed at the top of the monitoring well 70 for lowering or raising an electrical cable 26 electrically coupled to the device 10.

In use, the device 10 is gradually lowered by the servo means 73 from the top of the monitoring well 70, an electrical impulse transmitted by the first antenna so as to be detected during the downward travel of the device 10 through the monitoring well 70. Before the device 10 reaches the water 71, the first antenna 14 is in contact with air only whilst if the device 10 sinks beneath the surface of the water 71, the first antenna 14 is in contact with water only. Thus, by monitoring remotely the fluid in contact with the first antenna 14 and adjusting the servo means accordingly, the electrical cable 26 can be lowered or raised, as required, until the first antenna 14 lies correctly on the water surface.

In order to monitor the height of the ground water and the height through which the device 10 has been lowered into the monitoring well 70, the cable 26 may be provided along its length with graduations 74. Such graduations 74 may be provided with any of the embodiments described above.

Figure 14:
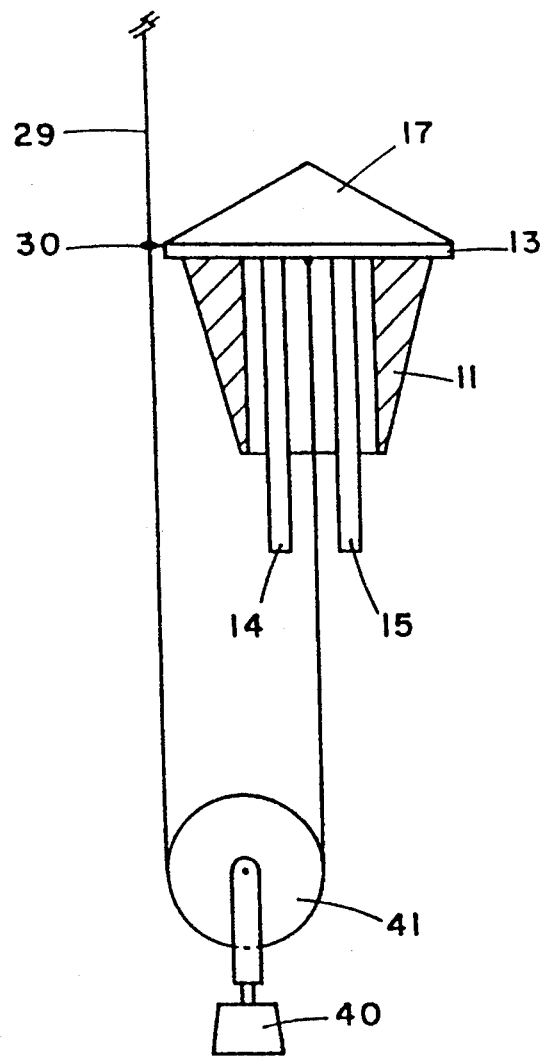
FIG. 14 shows schematically a device having an insertion type antenna permitting detection of an interface including a heavy layer of oil or an oil-water mixture.

FIG. 14 shows a part-sectional elevation of an embodiment employing an insertion type of antenna for detecting an interface between a thick layer of oil and water. In order to measure the interface between oil and water, the first antenna 14 must contact the oil whilst the second antenna 15 must contact the water. Thus, the device according to the invention is operative for a maximum depth of oil equal to the distance between the first and second antennas 14 and 15, respectively.

The embodiment shown in FIG. 14 is similar in principle to that described above with reference to FIG. 5 of the drawings, but the first and second antennas 14 and 15 are provided in the form of rods protruding downwardly from inside the housing 11. By this means the maximum depth of oil for which the interface between the oil and water may be measured is limited only by the lengths of the antennas 14 and 15. Such an arrangement is also useful for determining the relative proportions of oil and water is a mixture thereof.

In a similar manner, the construction described above with reference to FIG. 5 of the drawings may be employed having a plurality of ring antennas of which alternate pairs are connected in parallel and fixed to an elongated housing. The total capacitance of such an arrangement is equal to the sum of the individual capacitances associated with each pair of antennas and is proportional to the total concentration of water contacted by the parallel combination of capacitors. Thus, here again, by providing the ring antennas over a sufficiently elongated housing, the relative concentration of water over an extended depth of oil and water mixture may be determined.

Figure 15B:
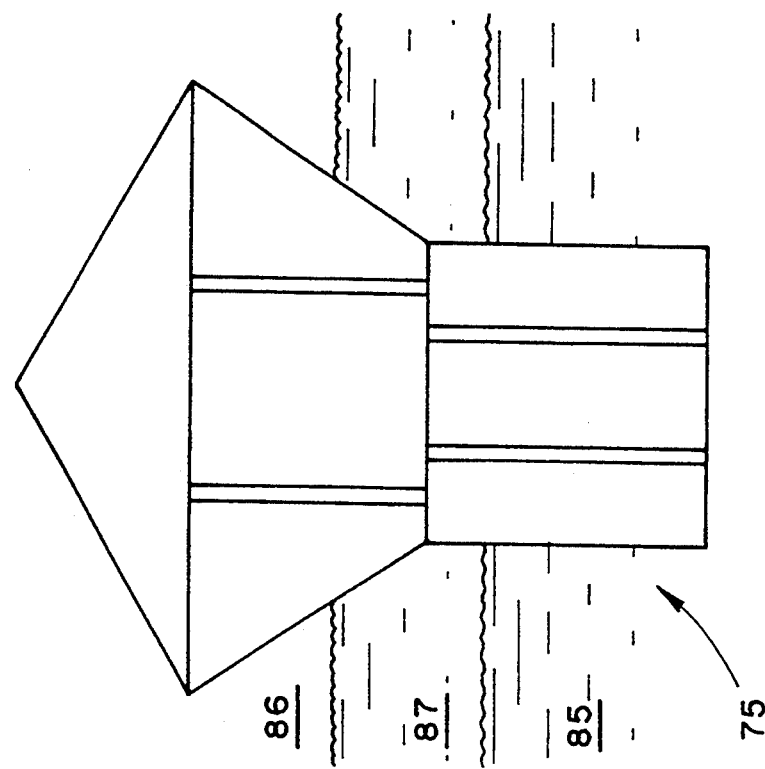
FIGS. 15a and 15b show pictorially a method for using a modified back-to-back arrangement of the devices illustrated in FIGS. 2 and 14, in order to determine layer thickness or relative concentration at a fluid interface.
Figure 15A:
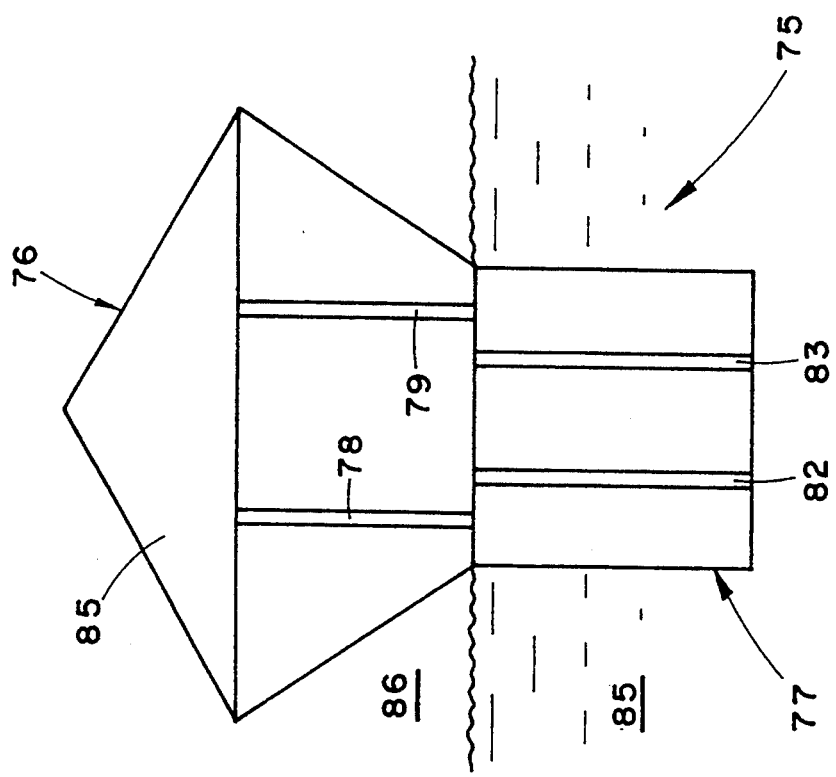

Referring now to FIGS. 15a and 15b there is shown an alternative device according to the invention employing a modified back-to-back arrangement of the devices described above with reference to FIGS. 2 and 14 of the drawings. Thus, there is shown in FIG. 15a a device depicted generally as 75 including an upper section 76 generally of the form shown in FIG. 2 and a lower section 77 being a modified form of the device shown in FIG. 14.

Both the upper and lower sections 76 and 77 are provided with respective first and second antennas 78, 79 and 82, 83. The upper section 76 has a tapered cap portion 85 so that liquid deposits spilling thereon do not adhere.

The arrangement of the antennas 78, 79, 82 and 83 is similar to that shown in FIG. 14 in that the antennas are disposed vertically so as to make contact with an extended depth of fluid.

In use, the device 75 is lowered down a monitoring well, for example, until it reaches water 85. The lower section 77 is weighted so that an equilibrium is achieved wherein the lower section 77 is completely submerged under water whilst the upper section 76 is completely submerged in air 86, as shown in FIG. 15a. Such equilibrium can, of course, be servo-controlled since the respective signals received by the antennas 78 and 79, on the one hand and 82 and 83 on the other hand will be different, owing to the markedly different energy absorptions of air and water.

FIG. 15b shows the situation if oil 87 now spills on to the water 85. In accordance with Archimedes' Principle, the device 75 rises so that it displaces its own weight of fluid. Specifically, since the spilled oil layer 87 is lighter than the water layer 85, a new equilibrium is reached where the weight of the water 85 displaced by the submerged portion of the lower section 77 plus the weight of the oil 87 displaced by the submerged portions of the upper and lower sections 76 and 77 is equal to the total weight of the device 75.

Since now, both the upper and lower sections 76 and 77 are partially covered by both water 85 and oil 87, the respective pairs of antennas 78, 79 and 82, 83 receive different signals than were obtained for the initial situation shown in FIG. 15a and it can easily be shown that the change in signals is proportional to the thickness of the oil layer 87. If alternatively, the oil 87 does not settle as a discrete layer on the surface of the water 85 but instead forms an emulsion, then it may be shown that the change in signals is proportional to the water-to-oil ratio, i.e. the relative concentration of the water and oil.

A further characteristic of the device 75 will now be mentioned qualitatively. The difference in level of the device 75 in the two equilibrium positions shown in FIGS. 15a and 15b is proportional to the specific gravity of the oil layer 87. Thus, if the specific gravity of the oil layer 87 were identical to that of water 85, the device 76 would rise such that the boundary between the upper and lower sections 76 and 77 remains in contact with air 86. Alternatively, if the specific gravity of the oil 86 were the same as that of air 86, the equilibrium would remain unaltered from that shown in FIG. 15a. For the actual situation wherein the oil 87 has a specific gravity between that of oil and air, the device 75 will rise by a corresponding amount which is, therefore, a measure of the specific gravity of the oil layer 87.

It will be understood that many variations may be made to the preferred embodiments without departing from the spirit of the invention.

For example, the ring through which the electrical cable is threaded may be replaced by an aperture in the flange portion or by a non-axial bore through the housing of the device.

Additionally, the whilst in the preferred embodiments the coupling means comprises a mechanical coupling for attaching thereto an electrical cable, it can equally well be constituted by a resonant circuit permitting a suitably tuned monitoring means to be coupled thereto remotely without requiring mechanical contact therewith.

It will also be appreciated that on account of the device's ability to detect the interface between water and oil, it can be used in a control system to control an auxiliary device such as a pump for pumping oil out of ground water, or for any other suitable application.

Additionally, whilst in the preferred embodiment the device operates on the principle of detecting a change in impedance in the fluid at the air-oil-water interface, it will be understood that the invention may equally well be employed with those devices based on a change in energy absorption by air, oil and water.

Finally, whilst in the preferred embodiments, spillage or seepage of a liquid on to an existing liquid has been described, this is by no means an essential prerequisite for use of the system subject of the invention. Specifically, any of the devices described above may be modified to permit through-flow of liquid so that the device may be located downstream in order to detect contaminants introduced upstream.

FIG. 16 shows such a modification of a device 90 having a hollow housing 91 for permitting liquid flow therethrough. First and second antennas 92 and 93 project inwardly from the internal periphery of the housing 91, although in all other respects the device 90 operates exactly the same as any of the floating devices described in detail above with respect to FIGS. 1 to 15 of the drawings.

A liquid flowing through the device 90 is detected by the antennas 92 and 93 which produce a first signal representative of the energy absorption of the liquid. If now a liquid contaminant is introduced upstream of the device 90, the thus contaminated liquid now flows through the device 90, a different intensity signal being received thereby and affording an immediate detection of the contaminant.

It will be appreciated that whilst in FIG. 16 the antennas 92 and 93 are depicted as band-type antennas around the internal periphery of the housing 91, the first antenna 92 may instead project upwardly from the internal periphery of the housing 91 so as to make contact at a free end thereof with the surface of the liquid flowing through the device 90. A contaminant flowing through the device 90 is detected in a manner identical to that described above.

We claim:

1. A device for measuring an interface between two fluids, the device having an electrical circuit transmitting means, a detector, a first antenna and a second electrically grounded antenna;

the transmitting means being arranged to transmit electrical impulses between the first and second antennas through one of the two fluids so as to be absorbed thereby, and the detector being arranged to detect a change either an impedance of a rate of absorption of energy which occurs at the interface;

wherein:

the device includes a housing for placing in the fluids, the housing being so dimensioned that, in use, the device floats in a volume of fluid, the first and second antennas project from the housing through the interface, and the electrical circuit includes a coupling means for coupling thereto a remote monitoring means whereby the interface may be measured remotely.

2. The device according to claim 1, further including:

a stabilizing mass supported from a second end of the housing opposite the first end for decreasing a tendency of the device to tilt within the fluid.

3. The device according to claim 2, wherein the stabilizing mass is at least partially constituted by an electrical cable connected to the coupling means.

4. A device according to claim 1, wherein:

the coupling means is provided on the second end of the housing, and an electrical cable is connected at a first end thereof to the coupling means and is provided at a second end thereof with means for connecting to the remote monitoring means.

5. The device according to claim 4, wherein:

the second end of the electrical cable is looped through a periphery of the housing so as to form a loop in the electrical cable, the housing is so dimensioned that, in use, the device floats in a volume of a fluid with the first antenna substantially contacting an upper surface of the fluid, and a stabilizing mass is supported from a pulley seated within the loop;

thereby permitting the device to be lowered into and withdrawn from the volume of fluid by means of the electrical cable.

6. The device according to claim 5 for use in a system for measuring an interface between two fluids, wherein:

the coupling means is provided at a first periphery of a second end of the housing opposite the first end, a first pulley is seated within a loop formed at a lower extremity of the electrical cable as it passes through said axial bore towards the coupling means, and a stabilizing mass is suspended from the first pulley.

7. The device according to claim 6, wherein:

a second pulley is rotatably suspended from a second periphery of the second end of the housing diametrically opposite the first periphery, the electrical cable is connected at a first end thereof to the coupling means and is looped from the coupling means over the second pulley so as to form a first loop at a lower extremity thereof between the second pulley and the coupling means, the first pulley is seated within the first loop, a second end of the electrical cable opposite the first end is anchored to an anchoring means, and a remote monitoring means is coupled to the anchoring means so as to be electrically connected to the electrical cable.

8. The device according to claim 7, wherein:

a third pulley is rotatably fixed to the first pulley, and the electrical cable is looped from the first pulley under the third pulley and upwardly through the axial bore.

9. The device according to claim 4, wherein the cable is graduated along a length thereof so as to provide an indication of a water table or ground water height through which the device must be lowered in order to make contact with the volume of fluid.

10. The device according to claim 4 for use in a system for measuring an interface between two fluids, wherein:

the second end of the cable is connected to an intermediate connector anchored within the fluid;

whereby the cable is completely immersed within the volume of fluid regardless of any tendency the device has to rise or fall within the volume of fluid.

11. The device according to claim 1, wherein:

the housing is provided with at least one axial bore extending therethrough, and an electrical cable is threaded through the axial bore for connection at a first end to the coupling means and for connection at a second end thereof to the remote monitoring means;

thereby permitting the device to be lowered into and withdrawn from the volume of fluid by means of the electrical cable.

12. The device according to claim 1, wherein:

the coupling means is provided on an uppermost central point of the device, and the electrical cable is connected at a first end thereof to the coupling means and is connected at a second end thereof to the remote monitoring means.

13. The device according to claim 12 for use in a system for measuring an interface between two fluids, including:

servo means coupled to the second end of the electrical cable for lowering or raising the electrical cable into or out of the volume of fluid until the first antenna makes contact with the interface.

14. A device according to claim 1, wherein:

the coupling means includes a resonant circuit tuned to a predetermined frequency, and the remote monitoring means is tuned to said frequency for effecting non-contact coupling to the resonant circuit.

15. For use with the device according to claim 2, a method for measuring spillage of a liquid onto a surface initially in contact with a fluid, comprising the steps of:

(a) placing the device onto the surface so that the first antenna is uppermost in contact with said fluid, (b) transmitting electrical pulses between the first and second antennas, and (c) detecting the impulses received by the first antenna;

whereby spillage of the liquid onto the surface covers the first antenna thereby enabling the device to detect the liquid at the liquid-fluid interface.

16. The method according to claim 15, when used to detect leakage of a fluid from a vessel containing the fluid onto a surface beneath the vessel.

17. The method according to claim 15, when used to detect oil leakage into a monitoring well.

18. The method according to claim 15, when used to detect oil leakage onto surface water.

19. The device according to claim 1, wherein the first and second antennas are elongated and substantially aligned with a longitudinal axis of the housing, whereby in use they protrude through an extended depth of fluid.

20. A device for measuring an interface between two fluids, the device having an electrical circuit comprising transmitting means, a detector, a first antenna and a second electrically grounded antenna;

the transmitting means being arranged to transmit electrical impulses between the first and second antennas through one of the two fluids so as to be absorbed thereby, and the detector being arranged to detect a change in either an impedance or a rate of absorption of energy which occurs at the interface; wherein the device includes a housing for placing in the fluids so as to contact the interface along a periphery of the housing towards a first end thereof, the housing is so dimensioned that, in use, the device floats in a volume of a fluid with the first antenna substantially contacting an upper surface of the fluid, the first antenna projects from the housing at said periphery, and the electrical circuit includes a coupling means for coupling thereto a remote monitoring means whereby the interface may be measured remotely.

21. The device according to claim 20, Wherein the first and second antennas are formed concentrically around the periphery of the housing.

22. The device according to claim 21, wherein:

the housing is so dimensioned that, in use, the device floats in a volume of fluid with the first antenna substantially contacting an upper surface of the fluid, and there is further provided a tapered cap portion having a base where diameter is no less than a diameter of the first end of the housing and which is mounted symmetrically thereon;

whereby any deposits contacting the cap portion when the device is in use are hindered from remaining thereon and from thereby altering the hydrostatic properties of the device.

23. The device according to claim 20, wherein the first and second antennas are fixed to a wall of the housing.

24. The device according to claim 23, including:

a plurality of bands of an electrically conductive material each formed on a wall of the housing and being displaced a predetermined distance from an adjacent band, and selection means coupled to all of the bands for sequentially selecting one of the bands for functioning as the first antenna.

25. For use with the device according to claim 24, a method for measuring an interface between two fluids, comprising the steps of:

(a) lowering the device until it floats in a volume of a first one of the liquids, and (b) selecting successive bands as the first antenna until an interface is detected between the two fluids.

26. The method according to claim 25, further including the step of:

(c) maintaining the device in a position whereat the selected first antenna remains substantially in contact with the interface between the two fluids.

27. The method according to claim 26, wherein step (c) is servo-controlled.

28. The device according to claim 24, wherein the housing is elongated and alternate ones of said bands are mutually connected in parallel along the length of the housing, whereby in use said bands are in contact with an extended depth of fluid.

29. The device according to claim 20, wherein:

the first antenna is tiltably fixed to the housing by means of calibration bolts;

whereby adjustment of the calibration bolt tilts the first antenna relative to the periphery of the housing thereby compensating for any manufacturing tolerances of the device and ensuring that, in use, the first antenna lies symmetrically on the interface.

30. For use with the device according to claim 20, a method for measuring an interface between two fluids, comprising the steps of:

(a) lowering the device through air whilst transmitting electrical pulses from the first antenna.

(b) constantly detecting the impulses received by the first antenna so as to detect a first fluid at an interface between the first fluid and air, (c) maintaining the device in a position whereat the first antenna remains substantially in contact with the first fluid-air interface;

whereupon a second fluid spilling onto the first fluid at the first fluid-air interface is detected by the device.

31. The method according to claim 30, wherein step (c) is servo-controlled.

32. For use with the device according to claims 19 or 28, a method for measuring a predetermined parameter of at least one fluid in a mixture of at least two fluids, said predetermined parameter being susceptible of measurement according to a quantity of energy absorbed by said at least one fluid, the method comprising the steps of:

(a) lowering the device into the fluid mixture so that the antennas are in contact with an extended depth of the fluid mixture, (b) transmitting electrical pulses between the first and second antennas, and (c) detecting electrical pulses received by the first antenna so as to determine said parameter.

33. The method according to claim 32, wherein said parameter is an average concentration of one of the fluids in said mixture.

34. The method according to claim 32, wherein said parameter is a relative concentration of the two fluids in said mixture.

35. The method according to claim 32, wherein said parameter is the thickness of one of the fluids in said mixture.

* * * * *